(12) United States Patent
Goto et al.

(10) Patent No.: US 7,222,880 B2
(45) Date of Patent: *May 29, 2007

(54) INFLATOR

(75) Inventors: Yuzo Goto, Hyogo (JP); Yasunori Iwai, Osaka (JP); Nobuyuki Katsuda, Hyogo (JP); Masayuki Nakayasu, Hyogo (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 25 days.

This patent is subject to a terminal disclaimer.

(21) Appl. No.: 10/204,904

(22) PCT Filed: Feb. 26, 2002

(86) PCT No.: PCT/JP02/01748

§ 371 (c)(1),
(2), (4) Date: Aug. 26, 2002

(87) PCT Pub. No.: WO02/070309

PCT Pub. Date: Sep. 12, 2002

(65) Prior Publication Data

US 2003/0168841 A1 Sep. 11, 2003

(30) Foreign Application Priority Data

Feb. 26, 2001 (JP) ............................. 2001-049824
May 11, 2001 (JP) ............................. 2001-142085
Sep. 4, 2001 (JP) ............................. 2001-267128

(51) Int. Cl.
*B60R 21/16* (2006.01)

(52) U.S. Cl. ...................... 280/740; 280/736; 280/741; 280/742

(58) Field of Classification Search ................ 280/736, 280/737, 740, 741, 742
See application file for complete search history.

(56) References Cited

U.S. PATENT DOCUMENTS

| | | | |
|---|---|---|---|
| 3,680,886 A | | 8/1972 | Mazelsky |
| 3,944,249 A | * | 3/1976 | Smith et al. ................. 280/742 |
| 4,021,058 A | * | 5/1977 | Suzuki et al. ................ 280/737 |
| 4,084,839 A | * | 4/1978 | Takagi et al. ............... 280/736 |
| 4,114,924 A | | 9/1978 | Kasagi et al. |
| 4,819,960 A | * | 4/1989 | Breed ......................... 280/734 |
| 5,429,387 A | | 7/1995 | Clark et al. |
| 5,496,062 A | | 3/1996 | Rink et al. |
| 5,527,066 A | | 6/1996 | Svensson |
| 5,542,702 A | | 8/1996 | Green et al. |
| 5,678,856 A | | 10/1997 | Headley |
| 5,782,486 A | | 7/1998 | Barnes et al. |
| 5,803,493 A | | 9/1998 | Paxton et al. |
| 5,906,394 A | | 5/1999 | Van Wynsberghe et al. |

(Continued)

FOREIGN PATENT DOCUMENTS

DE 29907617 U1 10/1999

(Continued)

*Primary Examiner*—Eric Culbreth
(74) *Attorney, Agent, or Firm*—Birch, Stewart, Kolasch & Birch, LLP

(57) ABSTRACT

An opening portion 14 of an inflator housing 12 and a diffuser portion 20 are connected by welding, and an inflow portion 42 of a gas discharging port 40 is press-fitted in and connected to a first gas discharging hole 22 of the diffuser portion 20.

22 Claims, 11 Drawing Sheets

U.S. PATENT DOCUMENTS

| | | |
|---|---|---|
| 6,068,293 A | 5/2000 | Shirk et al. |
| 6,131,948 A | 10/2000 | Cuevas |
| 6,158,769 A | 12/2000 | Swann et al. |
| 6,206,412 B1 * | 3/2001 | Swann et al. ............ 280/730.2 |
| 6,308,984 B1 | 10/2001 | Fischer |
| 6,959,649 B2 * | 11/2005 | Katsuda et al. ............. 102/531 |
| 2002/0109340 A1 | 8/2002 | Al-Amin |

FOREIGN PATENT DOCUMENTS

| | | |
|---|---|---|
| DE | 20003004 U1 | 7/2000 |
| EP | 0 715 993 A | 6/1996 |
| EP | 0 715 994 A | 6/1996 |
| EP | 0 819 585 A | 1/1998 |
| JP | 3014773 U | 6/1995 |
| JP | 8-11675 A | 1/1996 |
| JP | 3028182 U | 6/1996 |
| JP | 3031246 U | 9/1996 |
| JP | 10-100849 A | 4/1998 |
| JP | 10-211858 A | 8/1998 |
| JP | 11-139244 A | 5/1999 |
| JP | 2998891 B | 11/1999 |
| JP | 3001985 B | 11/1999 |
| WO | 97/34785 | 9/1997 |
| WO | 99/12775 | 3/1999 |
| WO | 99/15376 | 4/1999 |

* cited by examiner

US 7,222,880 B2

INFLATOR

This application is the national phase under 35 U.S.C. § 371 of PCT International Application No. PCT/JP02/01748 which has an International filing date of Feb. 26, 2002, which designated the United States of America.

BACKGROUND OF THE INVENTION

1. Field of the Invention

The present invention relates to an inflator that can be mounted on various kinds of vehicles for protecting a passenger when a vehicle receives an impact mainly from a side of the vehicle, and an air bag apparatus using the same.

2. Description of Related Art

As an inflator for an inflating type safety system of an automobile, in order to optimally protect a passenger in accordance with a position of a seat in a vehicle such as a driver side, a passenger side and the like, there are known various inflators such as an air bag inflator for a driver side, an air bag inflator for a passenger side, an air bag inflator for a side collision, an inflator for a curtain air bag, an inflator for a knee-bolster, an inflator for an inflatable seat belt, an inflator for a tubular system and an inflator for a pretensioner. Among these inflators, the inflator for a curtain air bag inflates and develops instantaneously a curtain air bag having a thickness of some centimeters over windows of a vehicle when the vehicle received the impact from the sides.

The above various inflators are required to be reduced in weight according to the requirement for weight reduction of a vehicle itself, and simultaneously, a facilitated manufacturing process and enhanced safety at actuation are also required.

As related conventional techniques, a device for inflating a flexible container using helium and hydrogen is disclosed in U.S. Pat. No. 5,527,066. A gas flow device for an air bag using a pressurized insert gas is disclosed in U.S. Pat. No. 5,782,486. An air bag apparatus for inflating an air bag with nitrogen or helium is disclosed in U.S. Pat. No. 3,680,886. A side-collision inflator housing for an air bag using a pressurized gas and a gas generating agent is disclosed in U.S. Pat. No. 5,803,493. A pressurized gas inflator using argon or nitrogen as a pressurized gas is disclosed in JP-U No. 3031246.

SUMMARY OF THE INVENTION

An object of the present invention is to provide an inflator in which reduction in size and weight is realized, a manufacturing process is facilitated, and actuation performance is improved, and to provide an air bag apparatus using the same.

The inflator of the present invention can be applied to any one of an inflator for a curtain air bag for a side collision and a side-collision inflator. The following is described in the case where the present invention is applied to the inflator for a curtain air bag.

As a means for solving the above problem, the present invention provides an inflator comprising, an inflator housing in which a pressurized medium is charged and one end is provided with an opening portion, a diffuser portion which is fixed to the opening portion of the inflator housing and is provided with a gas discharging hole for discharging the pressurized medium flowing from the opening portion to the outside at a time of actuation, a rupturable plate closing an outflow path for the pressurized medium between the diffuser portion and the opening portion of the inflator housing, an igniter which serves as rupturing means for the rupturable plate and provided in the diffuser portion, and a gas discharging port which serves as a discharging path for the pressurized medium and connected to the gas discharging hole of the diffuser portion, wherein the gas discharging hole of the diffuser portion and the gas discharging port are connected by press-fitting an inflow portion for the pressurized medium of the gas discharging port into the gas discharging hole.

By employing press-fitting as connecting means in this manner, the process can be remarkably facilitated and manufacturing time can be shortened as compared with cases in which electron-beam welding and laser beam welding are employed.

Further in the above invention, a connecting portion between the gas discharging hole of the diffuser portion and the gas discharging port can be fastened from outside with fastening means, and it is preferable to employ a metallic band as the fastening means.

As other means for solving the above problem, the present invention provides an inflator comprising, an inflator housing in which a pressurized medium is charged and one end is provided with an opening portion, a diffuser portion fixed to the opening portion of the inflator housing and provided with a gas discharging hole for discharging the pressurized medium flowing from the opening portion to the outside at a time of actuation, a rupturable plate closing an outflow path for the pressurized medium between the diffuser portion and the opening portion of the inflator housing, an igniter which serves as rupturing means for the rupturable plate and provided in the diffuser portion, and a gas discharging port which serves as a discharging path for the pressurized medium and connected to the gas discharging hole of the diffuser portion, wherein the gas discharging hole of the diffuser portion and the gas discharging port are connected by a resistance-welding.

If the resistance-welding is employed in connecting the gas discharging hole of the diffuser portion and the gas discharging port by welding, welding facilitates for resistance-welding are simpler as compared with other electron-beam welding, laser beam welding, and the like, so that the resistance-welding line can be easily added to the existent manufacturing line.

As other means for solving the above problem, the present invention provides an inflator comprising, an inflator housing in which a pressurized medium is charged and one end is provided with an opening portion, a diffuser portion fixed to the opening portion of the inflator housing and provided with a gas discharging hole for discharging the pressurized medium flowing from the opening portion to the outside at a time of actuation, a rupturable plate closing an outflow path for the pressurized medium between the diffuser portion and the opening portion of the inflator housing, an igniter which serves as rupturing means for the rupturable plate and provided in the diffuser portion, and a gas discharging port which serves as a discharging path for the pressurized medium and is connected to the gas discharging hole of the diffuser portion, wherein a screen having a plurality of outflow holes through which the pressurized medium passes is disposed in the gas discharging port.

Further in the above invention, the screen comprises a cylindrical member having one end open and the other end closed, and a plurality of the outflow holes for the pressurized medium are provided in a peripheral surface thereof.

In the above invention, the screen is preferably arranged such that its axial direction is coincident with the axial direction of the gas discharging port, and the screen is preferably mounted such that a flange portion contacts a step portion formed at an inner wall surface of the gas discharging port.

Further in the above invention, a relationship between a length L from a closed end surface of the screen to the outflow hole nearest the closed end surface and a diameter D of the rupturable plate preferably satisfies an expression: $L \geq D/2$. In this case, the length L is preferably 3 to 8 mm, more preferably 4 to 8 mm, and especially preferably 5 to 8 mm.

Further in the above invention, a diameter of the outflow hole provided in the screen is preferably 0.5 to 2 mm and more preferably 0.5 to 1.2 mm. A total opening area of a plurality of the outflow holes provided in the screen is preferably 20 to 1000 $mm^2$ and more preferably 100 to 500 $mm^2$.

By arranging the screen as in the above invention, the following effects (a) to (c) can be obtained.

(a) If the screen is arranged such that its axial direction is coincident with the axial direction of the gas discharging port, the pressurized medium changes its direction after colliding with the closed end surface of the screen and flows out from the outflow holes on the peripheral surface. With this change in the outflow direction of the pressurized medium, foreign objects (fragments of the rupturable plate and the like) can be easily collected at a pocket portion existing from the closed end surface to the nearest outflow hole of the screen. In this case, by mounting the screen at the flange portion, a clearance is not formed between the screen and the inner wall surface of the gas discharging port, and the foreign objects are prevented from flowing out without passing through the screen.

(b) When the inflator is actuated and the rupturable plate is ruptured by the igniter, the center portion if the rupturable plate is most rupturable since the center portion is nearest to the igniter and a pressure of the pressurized medium applied from the other side is largest at the center portion. Thereby, the maximum length of foreign objects generated by the rupture of the rupturable plate corresponds to a radius of the rupturable plate. As a result, if the relationship of $L \geq D/2$ is satisfied, the depth (L) of the pocket portion is equal to or greater than the length (D/2) of foreign objects and therefore, the foreign objects tend to remain in the pocket portion. In other words, the above-described effect (a) is further enhanced.

(c) Because the pressurized medium always enters the opening portion of the screen and is discharged through the outflow holes in the peripheral surface, the foreign objects included in the pressurized medium are prevented from leaking outside the inflator due to the above-described effects, and also the outflow pressure of the pressurized medium is controlled. By controlling the outflow pressure (an outflow amount per unit time) of the pressurized medium at actuation with the screen, it is possible to prevent the outflow pressure of the pressurized medium from being affected by the ruptured state of the rupturable plate.

As other means for solving the above problem, the present invention provides an inflator comprising an inflator housing in which a pressurized medium is charged and one end is provided with an opening portion, a diffuser portion fixed to the opening portion of the inflator housing and provided with a gas discharging hole for discharging the pressurized medium flowing from the opening portion to the outside at a time of actuation, a rupturable plate closing an outflow path for the pressurized medium between the diffuser portion and the opening portion of the inflator housing, an igniter which serves as rupturing means for the rupturable plate and provided in the diffuser portion, and a cylindrical gas discharging port which serves as a discharging path for the pressurized medium and connected to the gas discharging hole of the diffuser portion, wherein the gas discharging port has two or more opening portions only on a side surface, at least two of the two or more opening portions are positioned symmetrically in the radial direction or positioned similarly thereto, and a screen having a plurality of outflow holes is arranged inside the gas discharging port at the position where the opening portion is provided.

In the present invention, the opening portions are positioned symmetrically in the widthwise direction when two opening portions are provided to the gas discharging port. When three, four, or more opening portions are provided, the opening portions are preferably arranged at equal intervals in the circumferential direction.

Further in the above invention, the screen may comprise a single-layered or multi-layered cylinder made of a punching metal, a plain-stitched wire mesh or the similar member.

Further in the above invention, it is desirable that the pressurized medium is discharged for the gas discharging hole of the diffuser portion and flows from the opening portions provided to the side surface of the gas discharging port via the screen in the gas discharging port at actuation of the inflator, and that an opening area (A1) of the gas discharging hole may be smaller than a total opening area (A2) of holes of the screen facing the opening portions, and that A1/A2 is preferably 0.1 to 0.95, more preferably 0.3 to 0.95, and further preferably 0.4 to 0.8.

Further in the above invention, the screen is preferably arranged such that its axial direction is coincident with the axial direction of the gas discharging port.

Further in the above invention, a relationship between a length L1 from a closed end surface of the gas discharging port to the opening portion nearest the closed end surface and a diameter D of the rupturable plate preferably satisfies an expression: $L1 \geq D/2$.

By arranging the screen in association with the opening portions of the gas discharging port or the gas discharging hole of the diffuser portion as in the respective above inventions, the following effects (d) to (g) can be obtained as well as the effects similar to the above (a) and (b).

(d) When a fire or the like breaks out during storage/transportation of an inflator and then an accidental event such as a malfunction of the inflator occurs, in case of a gas discharging port having, in the side surface, only one opening portion or closely positioned opening portions, the inflator is ejected like a rocket due to the pressurized medium ejected from the opening portion, which is much dangerous. As described above, however, by positioning at least two opening portions symmetrically in the widthwise direction (in a radial direction when the gas discharging port is cylindrical) or similarly thereto, such an abnormal event is prevented.

(e) Since the opening portion is provided on the side surface of the gas discharging port, it is sufficient for the screen to function as a screen at least in a part facing an opening portion. Therefore, any special member for meeting the positions of the opening portion and an outflow hole of the screen is not required, and a commercial punching metal, a plain-stitched wire mesh or the like can be used directly, so that materials are inexpensive.

(f) Since the opening portion provided in the gas discharging port may be large, it is unnecessary to enhance a size accuracy in processing, thereby facilitating the process.

(g) Since the screen prevents foreign objects such as the fragments of the rupturable plate from being discharged outside, a hole diameter of each the outflow hole of the screen needs to be smaller than the foreign objects. However, if the hole diameter is too small, the pressurized medium cannot be discharged smoothly. Meanwhile, an opening diameter of the gas discharging hole in the diffuser portion instantaneously ejects the pressurized medium and controls the outflow pressure (outflow speed) of the pressurized medium.

Therefore, by regarding the diameter of the outflow hole of the screen and the diameter of the gas discharging hole as the opening areas and setting A1/A2 at a value in the predetermined range as described above, it is possible to ensure desirable states in removal of foreign objects and smooth discharge of the pressurized medium by the screen and control of the outflow pressure of the pressurized medium by the gas discharging hole.

In the above invention, when the inflator is connected to an air bag, the gas discharging port may have a convex portion provided, continuously in the circumferential direction or at intervals, on an outer surface in the part from the at least two openings on the side surface to a portion where the air bag is connected. At this time, the convex portion is preferably provided near the opening portion.

When the inflator and the air bag are connected to each other, the both are fixed and integrated with each other by fastening means after the air bag covers the gas discharging port to surround at least an opening portion, or after the gas discharging port is inserted into the air bag such that at least the opening portion enters in the air bag. In this case, if the gas discharging port has a flat shape with a uniform diameter, the air bag contacts tightly the opening portion provided to the side surface of the gas discharging port, so that a clearance through which the pressurized medium passes cannot be obtained between the inner surface of the air bag and the opening portion. Consequently, at a time of actuation of the inflator, specifically, at the initial stage of the actuation, smooth flow of the pressurized medium ejected from the opening portion in the side surface is blocked, and the inflation performance of the air bag may be disturbed. However, by providing the convex portion in the above manner, a clearance which serves as a flow path of the pressurized medium can be secured between the inner surface of the air bag and the opening portion in the side surface, so that such a problem as described above can be eliminated.

In the above invention, when the inflator is connected to an air bag, the gas discharging port may have a convex portion provided with a screw portion on a top surface continuously in the circumferential direction between the at least two openings on the side surface and a portion where the air bag is connected.

Such an inflator is desirable because a connecting process can be facilitated and further, connection strength can be enhanced by screwing the screw portion at the top surface of the convex portion into the screw portion provided to the opening portion of the air bag. Such an inflator is especially suitable when the inflator is connected to the air bag having a mouthpiece provided with the screw portion at the opening portion.

As other means for solving the above problem, the present invention provides an inflator comprising, an inflator housing in which a pressurized medium is charged and one end is provided with an opening portion, a diffuser portion fixed to the opening portion of the inflator housing and provided with a gas discharging hole for discharging the pressurized medium flowing from the opening portion to the outside at a time of actuation, a rupturable plate closing an outflow path for the pressurized medium between the diffuser portion and the opening portion of the inflator housing, an igniter which serves as rupturing means for the rupturable plate and provided in the diffuser portion, and a gas discharging port which serves as a discharging path for the pressurized medium and connected to the gas discharging hole of the diffuser portion, wherein the igniter disposed in the diffuser portion is fitted in from an opening portion at one end of the diffuser portion toward the rupturable plate.

In the above invention, the igniter disposed in the diffuser portion is preferably fixed by being crimped at a peripheral edge of the opening portion (opening portion at an opposite end portion to the rupturable plate) at the one end of the diffuser portion.

Conventionally, the diffuser portion and the inflator housing are connected to each other after fitting the igniter into the diffuser portion. In such a method, it is impossible to completely avoid possibilities of breakage of the igniter due to vibrations applied in connecting the diffuser portion to the inflator housing. However, by fitting from the opening portion at the one end of the diffuser portion toward the rupturable plate, the igniter can be fitted and fixed into the diffuser portion after connecting the diffuser portion to the inflator and therefore, it is possible to perfectly avoid possibilities of breakage of the igniter and ignition of the priming provided to the igniter.

In the above respective inventions, the gas discharging port is preferably mounted such that the axial direction of the gas discharging port and the axial direction of the inflator housing are parallel to each other.

In the above respective inventions, it is preferable that the gas discharging port comprises a cylindrical member having one end closed and the other end provided with an opening portion, and that the pressurized medium flows out from the opening portion.

If such a gas discharging port is used, because the outflow direction of the pressurized medium from the gas discharging port becomes coincident with the axial direction of the inflator housing, the mounting direction of the inflator and the inflating direction of the curtain air bag are coincident with each other, which facilitates the mounting of the inflator in the vehicle.

In the above respective inventions, the rupturable plate may be provided to the opening portion of the inflator housing or the diffuser portion.

As other means for solving the above problem, the present invention provides an air bag apparatus provided with activation signal-outputting means comprising an impact sensor and a control unit, and a module case accommodating the above inflator and an air bag.

In the inflator of the present invention, the mounting method of the inflator housing and the gas discharging port is improved, the mounting method of the igniter is improved, and the outflow pressure of the pressurized medium is controlled, and the manufacturing process is simplified and actuation performance is improved.

DETAILED DESCRIPTION OF THE PRESENT INVENTION

Figure 1:
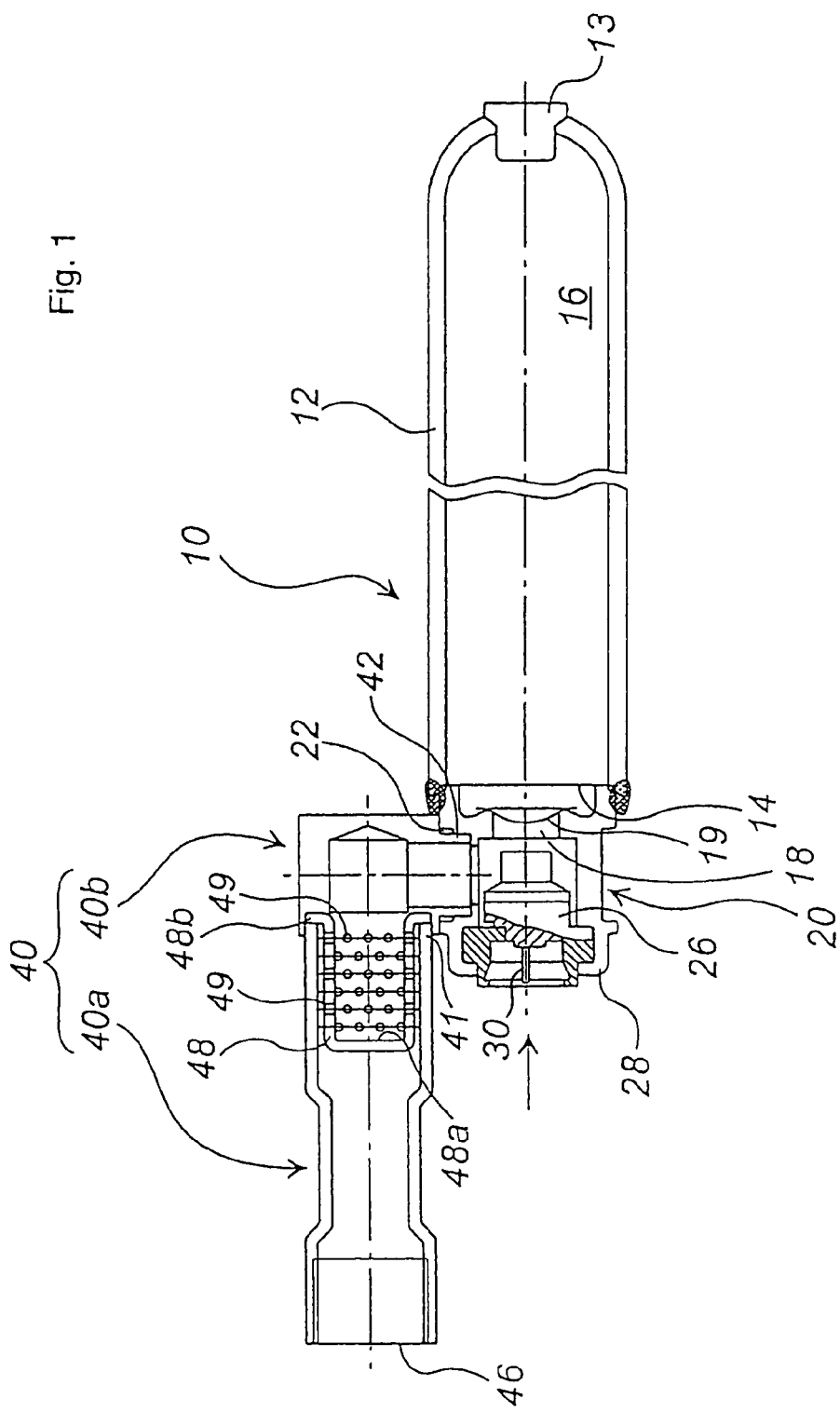
FIG. 1 is a schematic sectional view of an inflator in the longitudinal direction.
Figure 2:
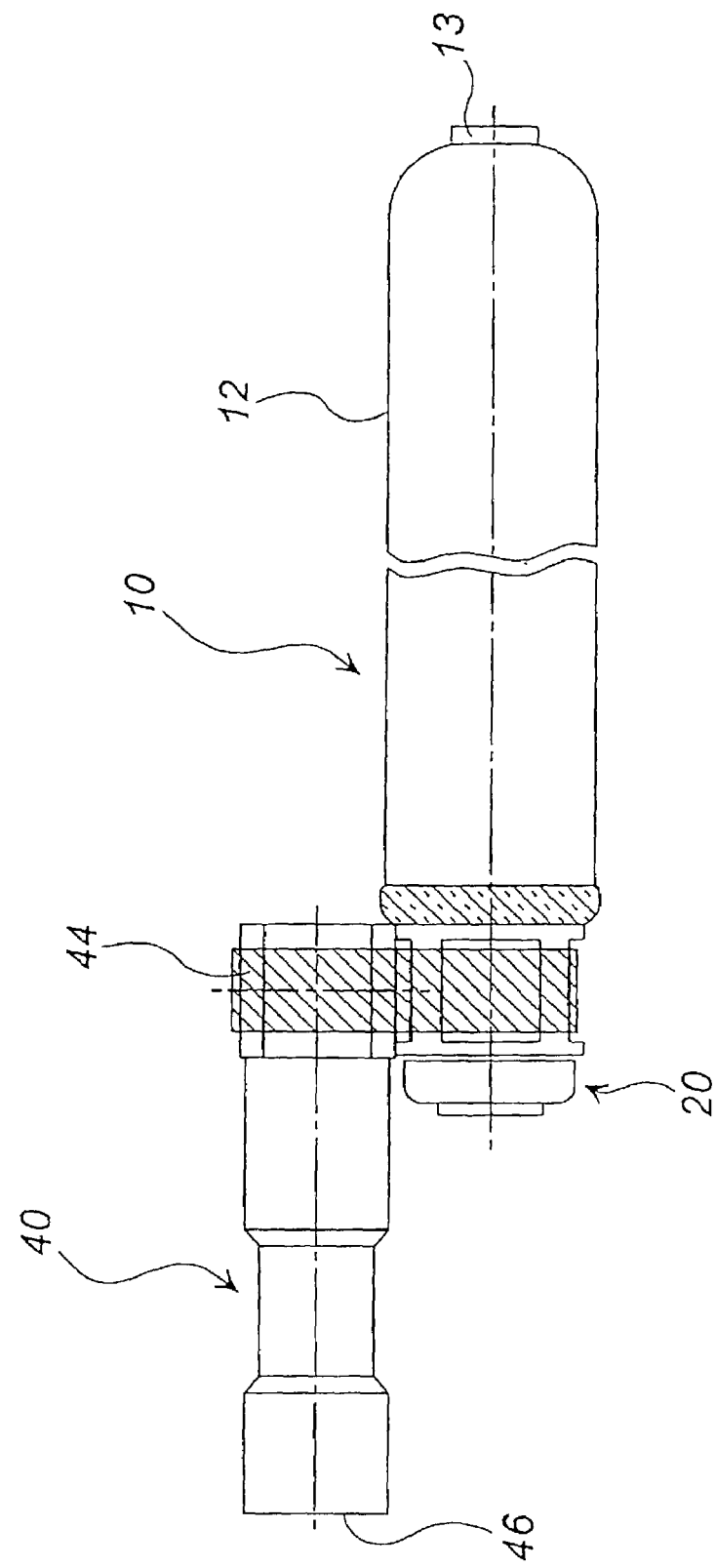
FIG. 2 is a plan view of the inflator.

An embodiment of the present invention will be explained below with reference to the drawings. FIG. 1 is a sectional view of an inflator 10 of the embodiment in the longitudinal direction, and FIG. 2 is a plan view of the embodiment of the inflator 10 of the present invention.

An inflator housing 12 has an opening portion 14 at one end and the other end closed. A pressurized medium comprising an inert gas such as argon, helium or a nitrogen gas is charged into an inner space 16 at the maximum pressure of about 70,000 kPa. The inflator housing 12 in a widthwise direction has a circular cross-section, and the opening portion 14 is also circular.

The inflator housing 12 may be produced by swaging or spinning a pipe, and it may be formed by utilizing an existent gas cylinder. In case of swaging or spinning a pipe, one end of the pipe is closed almost completely, but maintaining a small-diameter hole which serves as a charging hole for the pressurized medium. The pressurized medium is charged through the small-diameter hole and a sealing pin 13 inserted therein after a diffuser portion 20 is connected to the inflator housing 12, and then the inflator housing 12 is welded at the sealing pin 13 to be closed completely.

The diffuser portion 20, to which is connected to the opening portion 14 of the inflator housing 12 and has a first gas discharging hole 22 for discharging the pressurized medium to the outside.

The inflator housing 12 and the diffuser portion 20 may be connected by a welding as shown in FIG. 1. Alternatively, they may be connected by screwing a male screw portion provided on an outer periphery of an end portion in the inflator housing 12 into a female screw portion provided on an inner peripheral surface of an end portion in the diffuser portion 20.

An outflow path 18 for the pressurized medium between the opening portion 14 of the inflator housing 12 and the diffuser portion 20 is closed with a rupturable plate 19 having a bowl-like shape, and, before actuation, the inner space 16 of the inflator housing 12 is maintained at a high pressure in a hermetic state. Although the rupturable plate 19 is mounted on the diffuser portion 20 as shown in FIG. 1, it may be mounted to the opening portion 14 of the inflator housing 12. Meanwhile, the first gas discharging hole 22 of the diffuser portion 20 is not closed.

An igniter 26 having a priming is provided in the diffuser portion 20 as a rupturing means for the rupturable plate 19. After connecting the inflator housing 12 and the diffuser portion 20, the igniter 26 is mounted such that the igniter 26 is fitted from an opening portion of one end in the diffuser portion 20 toward the rupturable plate (in the direction shown with an arrow in FIG. 1) and then, fixed by crimping a peripheral edge 28 of the opening portion of the one end in the diffuser portion 20. Numeral 30 denotes a connector.

A gas discharging port 40 is connected to the diffuser portion 20 by press-fitting an inflow portion 42 of the pressurized medium of the gas discharging port 40 into the first gas discharging hole 22 of the diffuser portion 20. At this time, a diameter of the inflow portion 42 of the gas discharging port 40 is set to be slightly smaller than a diameter of the first gas discharging hole 22 of the diffuser portion 20.

As shown in FIG. 2, a connecting portion between the diffuser portion 20 and the gas discharging port 40 may be fastened by winding a metallic band 44 (fastening means), from outside, which has a thickness of about 0.6 to 2.5 mm and a width of about 5 to 20 mm and is made of stainless steel, carbon steel, aluminum, or the like. By being fastened with the metallic band 44 in this manner, adhesion between the diffuser portion 20 and the gas discharging port 40 can be enhanced to prevent leakage of the pressurized medium from the connecting portion.

The gas discharging port 40 is mounted such that the central axis (shown in a dotted chain line in FIGS. 1 and 2) of the inflator housing 12 and the central axis (shown in a dotted chain line in the longitudinal direction in FIGS. 1 and 2) of the gas discharging port 40 are parallel to each other.

The gas discharging port 40 comprises a main body portion 40a consisting of a cylindrical member in which the both ends are open and an opening portion of one end serves as a second gas discharging hole 46 and an adapter portion 40b having one end connected to the main body portion 40a and the other end connected at the inflow portion 42 of the pressurized medium to the first gas discharging hole 22. In the main body portion 40a, a screen 48 having a plurality of outflow holes 49 through which the pressurized medium passes is arranged. In this case, the gas discharging port 40 can have a structure such that the main body portion 40a and the adapter portion 40b are formed integrally.

The screen 48 is formed of a cylindrical member having one end open and the other end closed (closed end surface 48a), has a flange portion 48b at a peripheral edge of the opening portion, and has a plurality of the outflow holes 49 on the peripheral surface. The screen 48 is mounted by means of fitting, welding, or the like in a state such that the flange portion 48b contacts a step portion 41 (an end surface on one end of the main body portion 40a) provided on an inner wall surface of the gas discharging port 40. With the screen 48 mounted in this manner, the pressurized medium is always discharged through the outflow holes 49 provided on the screen 48 at actuation. The outflow holes 49 need to remove foreign objects without disturbing smooth discharge of the pressurized medium. A diameter of the outflow hole 49 can be selected from the range of 0.5 to 2 mm and preferably from the range of 0.5 to 1.2 mm.

The screen 48 may be formed such that an outflow direction of the pressurized medium from the outflow holes 49 is inclined with respect to the axial direction of the gas discharging port 40 as long as a pocket portion in the screen 48 can easily arrest foreign objects. It is also possible that the screen 48 itself is mounted to be inclined with respect to the axial direction of the gas discharging port 40. It is also possible to dispose the screen 48 in the adapter portion 40b.

Figure 3:
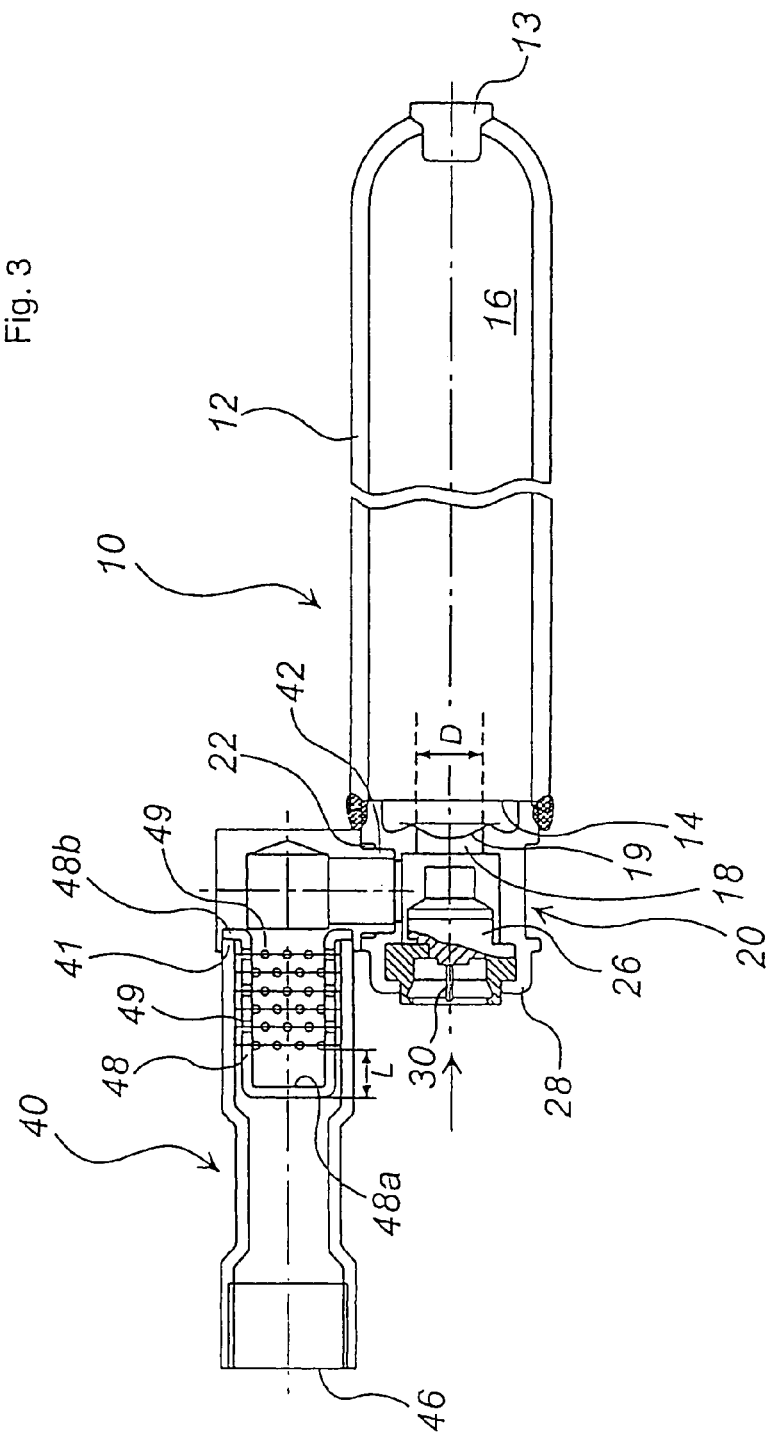
FIG. 3 is a schematic sectional view in the longitudinal direction of an inflator having a different screen from that of the inflator in FIG. 1.

The screen 48 can be formed such that a relationship between a length L from the closed end surface 48a to the nearest outflow hole 49 (preferably 3 to 8 mm, more preferably 4 to 8 mm, and especially preferably 5 to 8 mm) and a diameter D of the rupturable plate 19 satisfies the expression: $L \geq D/2$ as shown in FIG. 3. Here, the diameter D of the rupturable plate 19 is an actual diameter of the rupturable plate 19 or a diameter of a portion (excluding a portion which is fixed to an inner wall of the diffuser portion 20 and is not shattered) shattered when the rupturable plate 19 is ruptured.

In the inflator 10 shown in FIGS. 1 to 3, by adjusting a total opening area of the outflow holes 49 provided to the screen 48, i.e., by setting the total opening area smaller than an opening area of the first gas discharging hole 22, an outflow pressure of the pressurized medium at actuation can be controlled, and foreign objects such as fragments of the rupturable plate 19 can be prevented from flowing out of the inflator 10. In this case, the outflow pressure of the pressurized medium can be also controlled with the first gas discharging hole 22 by setting the opening area of the first gas discharging hole 22 smaller than the total opening area of the outflow holes 49.

Figure 4:
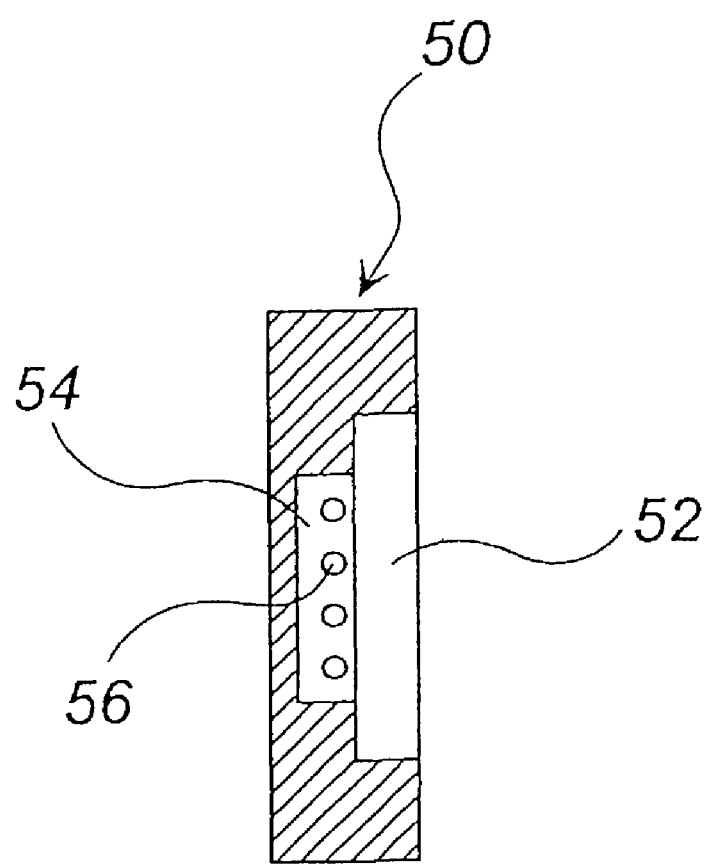
FIG. 4 is a sectional view of an adapter mounted to the inflator in the diametrical direction.

An adapter 50, as shown in FIG. 4, can be detachably mounted in the second gas discharging hole 46 side of the gas discharging port 40 during storage/transportation. The adapter 50 is a disk-shaped or cylindrical member and has therein a concave portion 52, into which an end portion in the second gas discharging hole 46 side of the gas discharging port 40 can be fitted, and a concave portion 54 having a smaller diameter than that of the concave portion 52. A plurality of ejecting holes 56 passing through the adapter 50 to reach an outer peripheral surface thereof are provided in the concave portion 54. The adapter 50 may be formed of an elastic member such as rubber or plastic, or may be provided with a fastening member such as a screw (not shown) in order to increase a force for connecting the adapter 50 and the gas discharging port 40.

By mounting the adapter 50, even if a contingent such as a fire occurs and causes the inflator 10 to activate during storage or transportation, the pressurized medium is ejected in the peripheral direction from the ejecting holes 56 of the adapter 50, the inflator 10 is prevented from being ejected like a rocket.

Figure 8:
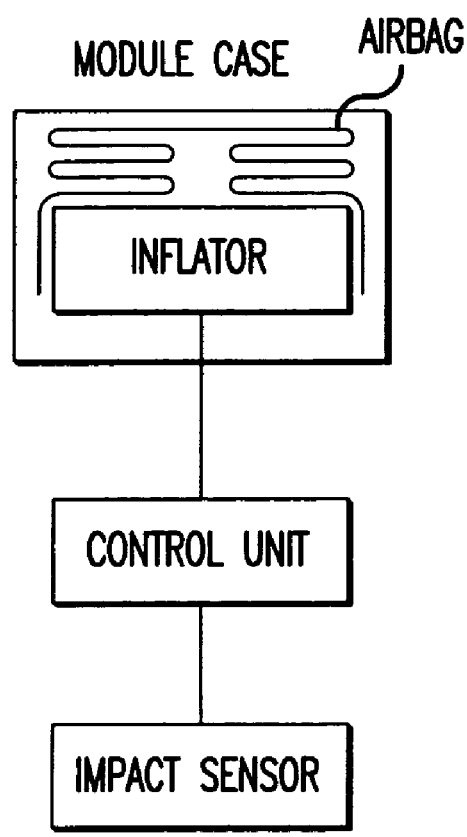
FIG. 8 shows a schematic diagram of an air bag system.
Figure 9:
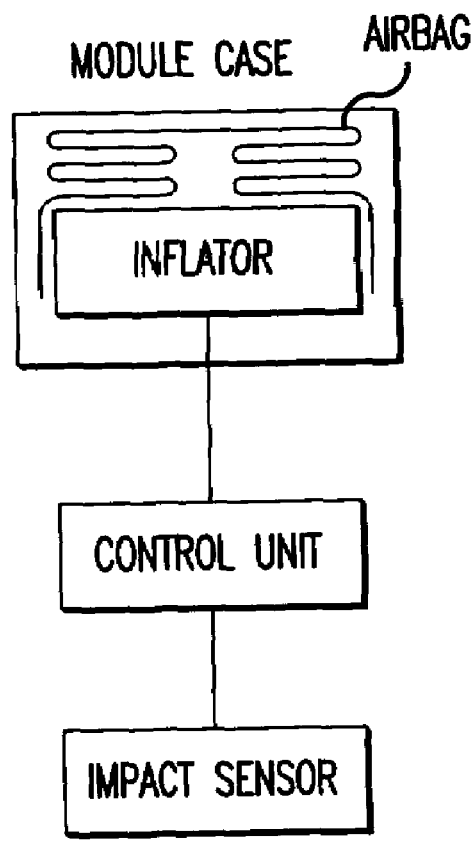
Figure 10:
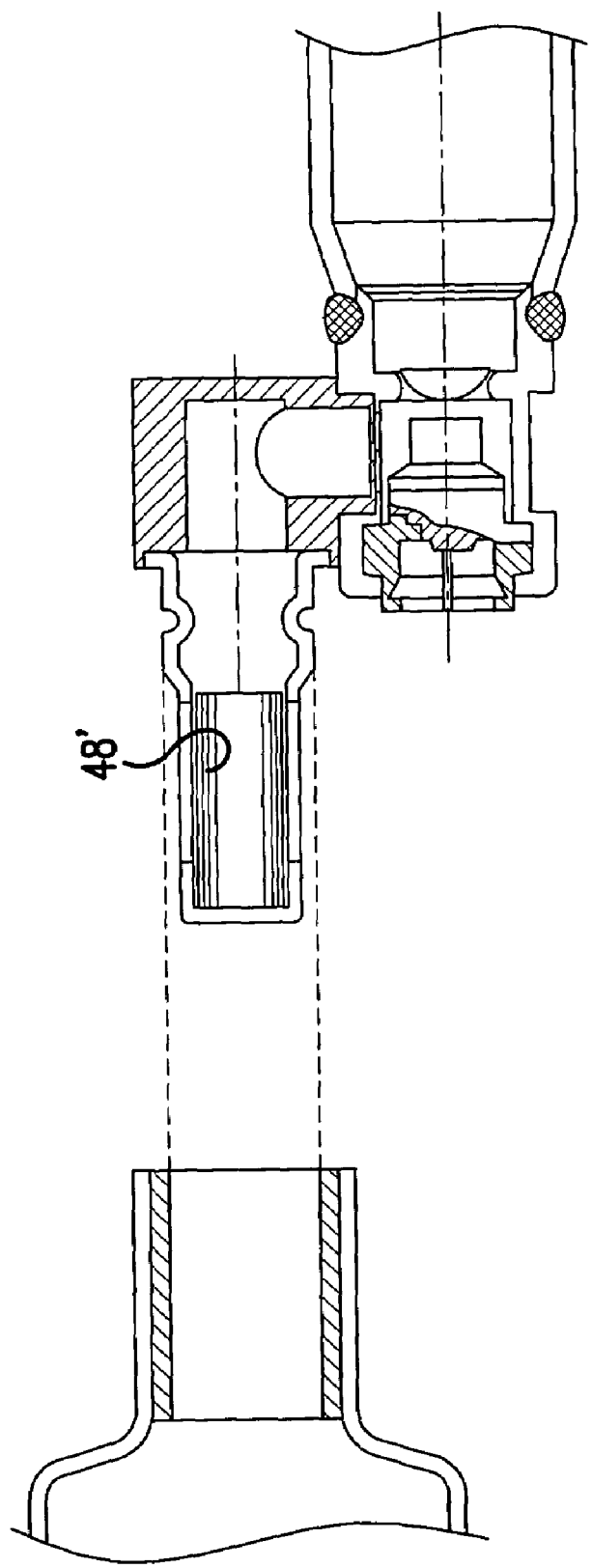
Figure 11:
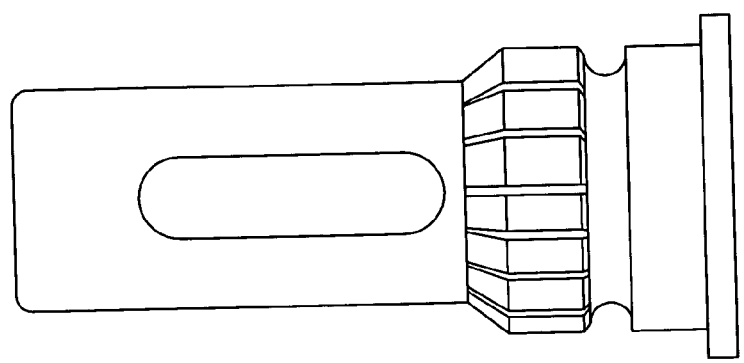

Next, the operation of the inflator 10 of the present invention will be described by reference to FIGS. 1 to 3. When the inflator 10 is mounted in a vehicle, the inflator 10 is incorporated into in a system comprising an activation signal-outputting means including an impact sensor and a control unit, a module case accommodating the above-described inflator 10, and a curtain air bag as shown in FIG. 8. The curtain air bag is connected at the second gas discharging hole 46 of the gas discharging port 40.

First, when the vehicle receives an impact, the igniter 26 is activated upon receiving the signal from the impact sensor, and the priming is ignited and burnt to rupture the rupturable plate 19.

Since the opening portion 14 is opened due to the rupture of the rupturable plate 19, the pressurized medium in the inner space 16 flows out from the first gas discharging hole 22 into the gas discharging port 40 via the inflow portion 42, and further, the pressurized medium is discharged from the second gas discharging hole 46 via the outflow holes 49 of the screen 48 to inflate the curtain air bag.

At this time, the pressurized medium collides with the closed end surface 48a of the screen 48, changes its direction, and then flows out from the outflow holes 49, and thereby, the foreign objects are easily collected in the pocket portion existing from the closed end surface 48a to the nearest outflow hole 49 in the screen 48. Furthermore, like the embodiment shown in FIG. 3, by setting a depth (L) of the pocket portion to be not shorter than a maximum length (D/2) of the foreign objects, the above effect is enhanced and the foreign objects can be easily collected. By discharging the pressurized medium via the screen 48 in this manner, the foreign objects are removed and the outflow pressure is controlled in a stable manner.

Figure 5:
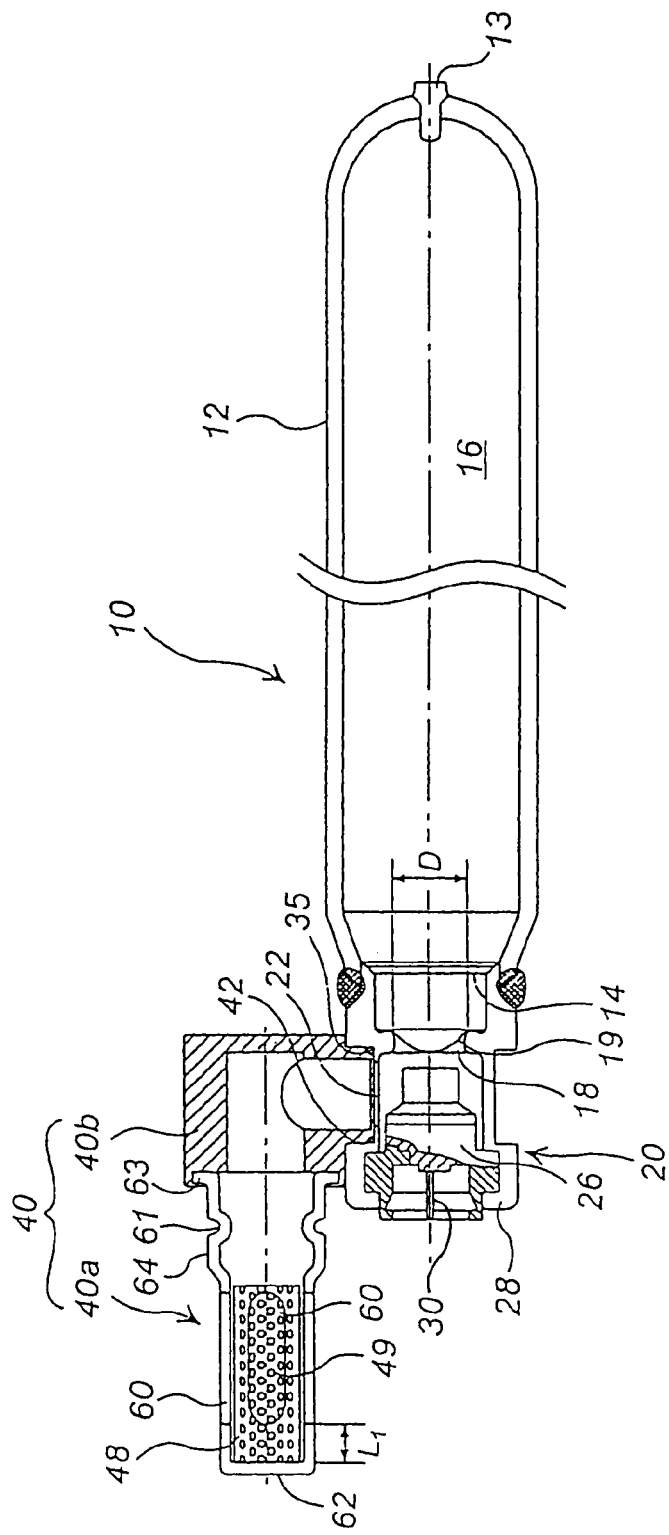
FIG. 5 is a sectional view of other embodiment of the inflator in the longitudinal direction.

Next, another embodiment of the present invention will be described with reference to FIG. 5. FIG. 5 is a sectional view of the inflator 10 of the present invention in the longitudinal direction and, the portions provided with the same reference numerals as those in FIGS. 1 to 3 are identical to each other.

The gas discharging port 40 comprises a main body portion 40a having one end closed (a closed end surface 62) and the other end open, a flange portion 63, and an adapter portion 40b. The main body portion 40a and the adapter portion 40b are connected by engaging the flange portion 63 of the main body portion 40a with the inside of the adapter portion 40b or by crimping an end portion of the adapter 40b after fitting. Alternatively, they may be connected by a resistance-welding. In this case, the gas discharging port 40 can have a structure such that the main body portion 40a and the adapter portion 40b are formed integrally.

The adapter portion 40b and the diffuser portion 20 are connected by a resistance-welding at a welded portion 35. At this time, the main body portion 40a may be connected after resistance-welding the adapter portion 40b (inflow portion 42) to the diffuser portion 20 or the adapter portion 40b and the diffuser portion 20 may be resistance-welded after connecting the main body portion 40a to the adapter portion 40b.

A plurality of opening portions 60 (second gas discharging holes) are provided to a side surface of the main body portion 40a. In the main body portion 40a, a screen 48 which has a plurality of outflow holes 49 and removes foreign objects by letting the pressurized medium pass through is disposed. A diameter of the outflow hole 49 can be selected from the same numeral range as that in FIGS. 1 to 3.

At least two of a plurality of the opening portions 60 are positioned symmetrically in the widthwise direction or positioned similarly thereto. Six opening portions 60 may be provided, for example, and are disposed at equal intervals in the circumferential direction.

As the screen 48, a single-layered or a multi-layered cylindrical member 48' made of a punching metal, a plain-stitched wire mesh or the like may be used and the screen is arranged such that the axial direction of the screen 48 and the axial direction of the gas discharging port 40 (main body portion 40a) are coincident with each other. Although the outflow holes 49 are provided over the entire screen 48, only the outflow holes 49 facing the opening portions 60 substantially discharge the pressurized medium and remove the foreign objects.

The screen 48 may be fixed by a following method, for example. After inserting and arranging the cylindrical punching metal or the like having nearly the same outside diameter as an inside diameter of the main body portion 40a into the main body portion 40a, embossing is performed to provide about three convex portions on the side surface of the main body portion 40a from the outside toward the inside, and thereby the screen is supported and fixed with the convex portions. Alternatively, the punching metal or the like is rolled tightly to have an outer diameter sufficiently smaller than the inside diameter of the main body portion 40a and is fixed by utilizing the act of the tightly-rolled punching metal or the like which unrolls radially and presses an inner wall of the main body portion 40a.

The relationship between the length L1 from the closed end surface 62 to the nearest opening portion 60 of the gas discharging port 40 and the diameter D of the rupturable plate 19 satisfies the expression: L1≧D/2 for the same reason as the above expression: L≧D/2. Here, L1 can be set in nearly the same numeral range as above L.

In the main body portion 40a, near the adapter 40b, a convex portion 64 and a groove portion (concave portion) 61 are provided continuously or at intervals (preferably, successively) in the circumferential direction.

Figure 7:
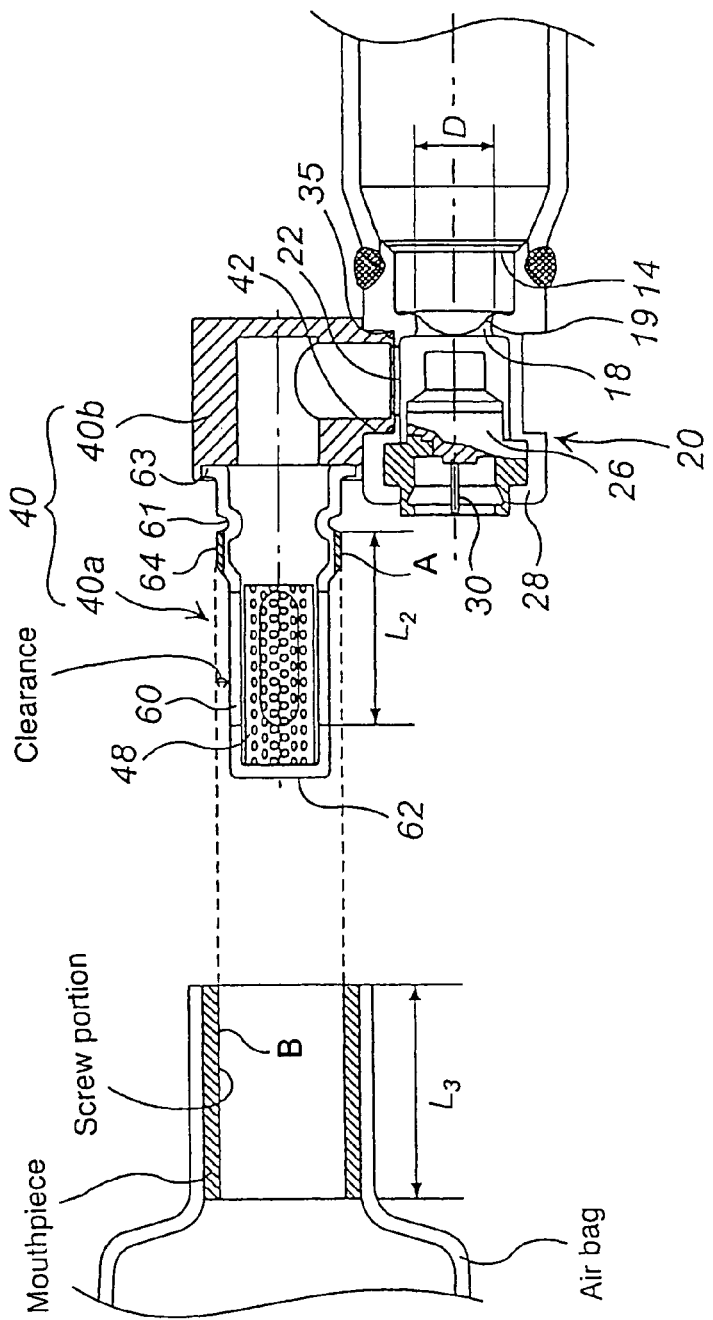
FIG. 7 is a view for explaining a method for connecting the inflator and the air bag.

The convex portion 64 has a plane top surface, which can be provided with a screw portion (a male screw or a female screw as shown in FIG. 7) if necessary, and is provided closer to the opening portions 60. The convex portion 64 is useful when the inflator 10 is connected to the air bag at the gas discharging port 40. The radial height and the axial length of the convex portion 64 can be determined in view of connection properties (connection strength, workability, and the like) to the air bag.

The groove portion 61 serves to firmly couple the air bag and the main body portion 40a and to prevent dislocation of the air bag since the air bag can be fastened at the groove portion 61 after fitting the air bag over the main body portion 40a in assembling the air bag apparatus. A radial depth of the groove portion 61 can be determined in view of connection properties (connection strength, workability, and the like) to the air bag.

An opening area (A1) of the gas discharging hole (first gas discharging hole) 22 is set to be smaller than a total opening area (A2) of the outflow holes 49 of the screen 48 facing the opening portion 60, and A1/A2 is preferably 0.1 to 0.95, more preferably 0.3 to 0.95, and further more preferably 0.4 to 0.8.

The opening areas of the gas discharging hole 22 and the like are determined according to various factors such as a size of the inflator 10 and an amount of charged pressurized medium. For example, the opening area (A1) of the gas discharging hole 22 can be selected from the range of 15 to 30 mm$^2$ and the total opening area (A2) of the outflow holes 49 can be selected from the range of 30 to 60 mm$^2$. At this time, a total opening area of the opening portions 60 is naturally larger than above A2 and can be selected from the range of 100 to 150 mm$^2$, for example.

Next, the operation of the inflator 10 shown in FIG. 5 will be described. At a time of actuation, the pressurized medium is discharged from the gas discharging hole 22 of the diffuser portion 20 like in FIGS. 1 to 3, passes through the screen 48 after flowing into the gas discharging port 40, and is discharged from the opening portions 60 to inflate the air bag. At this time, foreign objects such as fragments of the rupturable plate 19 are captured like in FIGS. 1 to 3.

Figure 6:
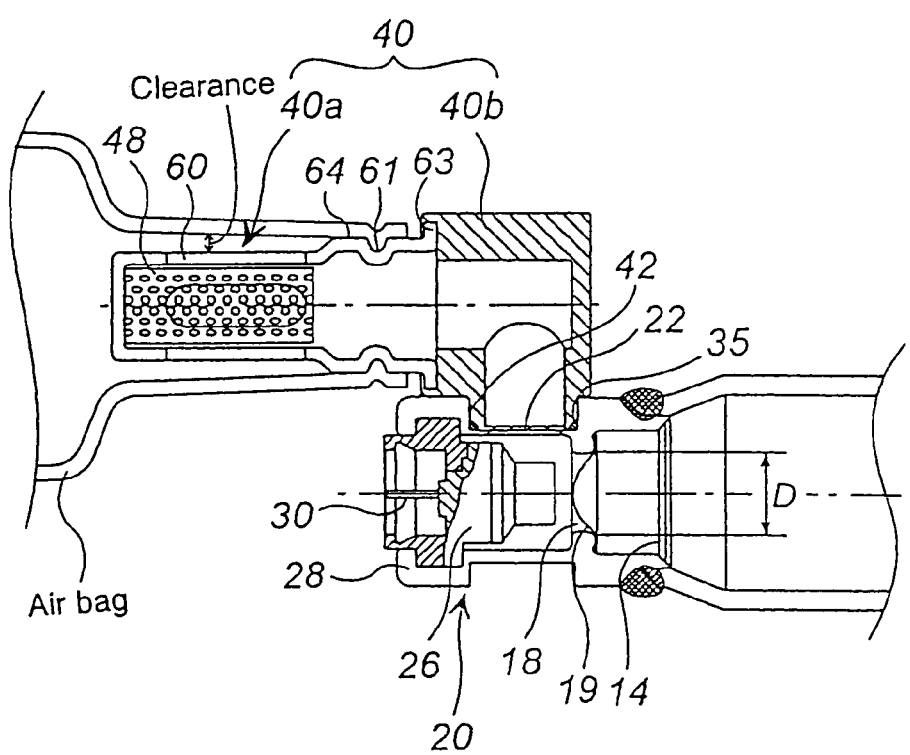
FIG. 6 is a view for explaining a method for connecting the inflator and an air bag.

Next, a method of connecting the inflator 10 and the air bag will be described with reference to FIG. 6. As shown in FIG. 6, the air bag is fitted over the gas discharging port main body portion 40a and engages the groove portion 61 and is fastened by a belt-like fastening means (not shown) at the groove portion 61 to connect and fix them to each other. At this time, due to the convex portion 64, a clearance is secured between an inner surface of the air bag and the opening portions (second gas discharging holes) 60 as shown in the drawing. Therefore, at a time of actuation of the inflator 10 and especially at the initial stage of actuation, ejection of the pressurized medium is not blocked and the air bag is inflated swiftly and reliably. In this case, once the pressurized medium is ejected smoothly at the initial stage of actuation, a flow path for the pressurized medium can be secured thereafter. Therefore, the above clearance does not need to be large, and it is sufficient that the convex portion 64 has the radial height (the height from a peripheral surface provided with the opening portions 60, i.e., a size of the clearance) such that the inner surface of the air bag and a peripheral edge of the opening portions 60 are not in contact with each other in view of the outflow pressure of the pressurized medium and the like.

Next, the method of connecting the inflator 10 and the air bag will be described with reference to FIG. 7. FIG. 7 includes schematic depictions of screw portions in accordance with the present invention. The male screw portion A is provided to the top surface of the convex portion 64 as shown in FIG. 7, and a mouthpiece having, on an inner surface thereof, a female screw portion B is mounted to an opening portion of the air bag. By screwing the male screw portion A of the convex portion 64 into the female screw portion B of the mouthpiece, the inflator 10 and the air bag are connected. A length L2 from an end (end closer to the groove portion 61) of the convex portion 64 to an end (end closer to the closed end surface 62) of the opening portion 60 is set to be equal to a length L3 of the mouthpiece. As a result, the clearance which serves as the outflow path of the pressurized medium is secured between the opening portions 60 and the inner surface of the mouthpiece when the air bag is mounted to the gas discharging port. Consequently, the air bag is inflated swiftly and reliably. In this case, once the pressurized medium is ejected smoothly at the initial stage of actuation, the flow path for the pressurized medium is secured thereafter as described above. Therefore, L2>L3 can be adopted. The radial height of the convex portion 64 shown in FIG. 7 (a size of the clearance) may be equal to that of FIG. 6, and the axial length of the top surface of the convex portion 64 is determined in view of strength of connection to the mouthpiece portion by screwing.

Incidentally, when the inflator of the present invention is used as an inflator for a side collision, the gas discharging port 40 can be omitted, and the first gas discharging hole 22 is connected to the air bag directly or via a proper adapter.

The invention claimed is:

1. An inflator, comprising:
    an inflator housing containing a pressurized medium and one end thereof provided with an opening portion;
    a diffuser portion fixed to the opening portion of the inflator housing and provided with a gas discharging hole for discharging the pressurized medium flowing from the opening portion to an outside at a time of actuation of the inflator;
    a rupturable plate closing an outflow path for the pressurized medium between the diffuser portion and the opening portion of the inflator housing;
    an igniter provided in the diffuser portion for rupturing the rupturable plate;
    a gas discharging port connected to the gas discharging hole of the diffuser portion for passing the pressurized medium therethrough, the gas discharging port having an inflow portion for receiving the pressurized medium discharged from the gas discharging hole, and the gas discharging port connected to the gas discharging hole by press-fitting the inflow portion into the gas discharging hole; and
    fastening means for fastening a connecting portion between the gas discharging hole of the diffuser portion and the gas discharging port.

2. An air bag apparatus, comprising:
    an inflator according to claim 1;
    an activation signal-outputting means having an impact sensor and a control unit;
    a module case accommodating the inflator; and
    an air bag.

3. An inflator according to claim 1, wherein the fastening means is a metallic band wound around the connecting portion from an outside thereof.

4. An inflator, comprising:
an inflator housing containing a pressurized medium and one end thereof provided with an opening portion;
a diffuser portion fixed to the opening portion of the inflator housing and provided with a gas discharging hole for discharging the pressurized medium flowing from the opening portion to an outside at a time of actuation of the inflator;
a rupturable plate closing an outflow path for the pressurized medium between the diffuser portion and the opening portion of the inflator housing;
an igniter provided in the diffuser portion for rupturing the rupturable plate; and
a gas discharging port connected to the gas discharging hole of the diffuser portion for passing the pressurized medium therethrough, the gas discharging port having an inflow portion for receiving the pressurized medium discharged from the gas discharging hole, and the gas discharging port connected to the gas discharging hole by press-fitting the inflow portion into the gas discharging hole,
wherein a connecting portion between the gas discharging hole of the diffuser portion and the gas discharging port is fastened by a metallic band wound around the connecting portion from an outside thereof.

5. An inflator, comprising:
an inflator housing containing a pressurized medium and one end thereof provided with an opening portion;
a diffuser portion made of a single-piece element and fixed to the opening portion of the inflator housing and provided with a gas discharging hole for discharging the pressurized medium flowing from the opening portion to an outside at a time of actuation of the inflator;
a rupturable plate closing an outflow path for the pressurized medium between the diffuser portion and the opening portion of the inflator housing;
an igniter attached directly to the diffuser portion for rupturing the rupturable plate; and
a gas discharging port directly connected to the gas discharging hole of the diffuser portion by a resistance welding for passing the pressurized medium therethrough, the gas discharging port having an inflow portion for received the pressurized medium discharged from the gas discharging hole.

6. An inflator, comprising:
an inflator housing, storing pressurized medium therein, provided with an opening portion formed at one end thereof;
a diffuser portion substantially cylindrical in shape having a first end and a second end axially opposite to the first end and including a first opening provided in the first end for connecting to the opening portion such that a center axis of the diffuser portion coincides with a center axis of the inflator housing and a second opening formed in the second end provided co-axially opposite to the first opening, the diffuser portion being further provided with a reduced portion formed in an outer circumferential surface between the first end and the second end such that an outer diameter of the diffuser portion is reduced, the diffuser portion being provided with a single gas discharging hole formed in said reduced portion for discharging the pressurized medium therethrough at a time of actuation of the inflator;
a rupturable plate closing an outflow path for the pressurized medium between the diffuser portion and the opening portion of the inflator housing;
an igniter provided in the second opening of the diffuser portion for rupturing the rupturable plate; and
an L-shaped gas discharging port connected to the gas discharging hole of the diffuser portion for passing the pressurized medium therethrough, the L-shaped gas discharging port including an adapter portion connecting to the gas discharging hole and a main body portion extending in an axial direction of the inflator housing.

7. An inflator according to claim 6, further comprising:
a screen including a cylindrical member having an open end and a closed end, and having a plurality of outflow holes penetrating the cylindrical member.

8. An inflator according to claim 7, wherein the screen is arranged such that an axial direction of the screen is coincident with an axial direction of the main body portion.

9. An inflator according to claim 7, wherein the screen has a closed end and a relationship between a length L from the closed end to an outflow hole closest to the closed end and one of a diameter D of the rupturable plate and a diameter D of a portion of the rupturable plate shattered when ruptured satisfies $L \geq D/2$.

10. An inflator, comprising:
an inflator housing containing a pressurized medium and one end thereof provided with an opening portion;
a diffuser portion fixed to the opening portion of the inflator housing and provided with a gas discharging hole for discharging the pressurized medium flowing from the opening portion to the outside at a time of actuation of the inflator;
a rupturable plate closing an outflow path for the pressurized medium between the diffuser portion and the opening portion of the inflator housing;
an igniter provided in the diffuser portion for rupturing the rupturable plate;
a gas discharging port connected to the gas discharging hole of the diffuser portion for passing the pressurized medium therethrough; and
a screen having a plurality of outflow holes disposed in the portion port for passing the pressurized medium therethrough,
wherein the screen has a flange portion provided at a peripheral edge of an open end portion thereof, and the screen is mounted such that the flange portion makes contact with a step portion formed at an inner wall surface of the gas discharging port.

11. An inflator, comprising:
an inflator housing containing a pressurized medium and one end thereof provided with a first opening portion;
a diffuser portion made of a single-piece element and fixed to the first opening portion and provided with a gas discharging hole for discharging the pressurized medium flowing from the first opening portion to an outside at a time of actuation of the inflator;
a rupturable plate closing an outflow path for the pressurized medium between the diffuser portion and the first opening portion of the inflator housing;
an igniter attached directly to the diffuser portion for rupturing the rupturable plate; and
a gas discharging port directly connected to the gas discharging hole of the diffuser portion for passing the pressurized medium therethrough, the gas discharging port having a plurality of second opening portions formed only in a side surface thereof, at least two second opening portions being positioned symmetrically in a widthwise direction.

12. An inflator according to claim 11, further comprising:
a screen provided with a plurality of outflow holes disposed inside the gas discharging port at a position where the second opening portions are provided.

13. An inflator according to claim 12, wherein the pressurized medium is discharged from the gas discharging hole and flows out from the second opening portions of the gas discharging port via the screen upon actuation of the inflator, and an opening area (A1) of the gas discharging hole is smaller than a total opening area (A2) of holes of the screen facing the second opening portions.

14. An inflator according to claim 13, wherein A1/A2 is 0.1 to 0.95.

15. An inflator according to claim 12, wherein the screen is arranged such that an axial direction thereof is coincident with an axial direction of the gas discharging port.

16. An inflator according to claim 11, wherein the gas discharging port has a closed end and a relationship between a length L1 from the closed end to a second opening portion closest to the closed end and one of a diameter D of the rupturable plate and a diameter D of a portion of the rupturable plate shattered when ruptured satisfies $L1 \geq D/2$.

17. An inflator, comprising:
an inflator housing containing a pressurized medium and one end thereof provided with a first opening portion;
a diffuser portion made of a single-piece element and fixed to the first opening portion and provided with a gas discharging hole for discharging the pressurized medium flowing from the first opening portion to an outside at a time of actuation of the initiator;
a rupturable plate closing an outflow path for the pressurized medium between the diffuser portion and the first opening portion of the inflator housing;
an igniter attached directly to the diffuser portion for rupturing the rupturable plate; and
a gas discharging port directly connected to the gas discharging hole of the diffuser portion for passing the pressurized medium therethrough, the gas discharging port having a plurality of second opening portions formed only in a side surface thereof, at least two second opening portions being positioned symmetrically in a widthwise direction, wherein the gas discharging port has a convex portion provided, continuously or at intervals along a longitudinal direction of the gas discharging port, on an outer surface thereof between the at least two second opening portions and a portion where the gas discharging port is connected to the diffuser portion and wherein the convex portion is provided adjacent the second opening portions.

18. An inflator, comprising:
an inflator housing containing a pressurized medium and one end thereof provided with an opening portion;
a diffuser portion fixed to the opening portion of the inflator housing and provided with a gas discharging hole for discharging the pressurized medium flowing from the opening portion to an outside at a time of actuation of the inflator;
a rupturable plate closing an outflow path for the pressurized medium between the diffuser portion and the opening portion of the inflator housing;
an igniter provided in the diffuser portion for rupturing the rupturable plate; and
a gas discharging port connected to the gas discharging hole of the diffuser portion for passing the pressurized medium therethrough, the gas discharging port having a plurality of second opening portions formed in a circumferential direction of a side surface thereof and in a first portion thereof having a first outer diameter, the gas discharging port having a connecting end attached to the gas discharging hole and a closed end opposite to the connecting end, the gas discharging port including a second portion having a larger outer diameter than the first outer diameter, and being provided between the connecting end and the first portion, the gas discharging port having a first screw portion provided on an outer surface of the second portion such that an annular clearance is provided between the first portion and a connecting member from an air bag when the connecting member is attached to the second portion.

19. An air bag apparatus, comprising:
an inflator according to claim 18; and
an air bag having, at an opening thereof, the connecting member provided with a second screw portion on an inner surface, such that the air bag is connected to the inflator by inserting the gas discharging port into the connecting member, and engaging the first screw portion with the second screw portion.

20. The air bag apparatus according to claim 19, wherein a length of the connecting member is such that the first screw portion can be screwed into the connecting member and that at least part of the second opening portions is covered with the connecting member in an axial direction of the gas discharging port.

21. An inflator, comprising:
an inflator housing charged with a pressurized medium, one end of said housing being provided with an opening portion;
a diffuser portion fixed to the opening portion of the inflator housing and provided with a gas discharging hole for discharging the pressurized medium flowing from the opening portion to the outside at a time of actuation of the inflator;
a rupturable plate closing an outflow path for the pressurized medium between the diffuser portion and the opening portion of the inflator housing;
an igniter for rupturing the rupturable plate, the igniter being attached to an opening formed in the diffuser portion such that the igniter opposes the rupturable plate; and
a gas discharging port connected to the gas discharging hole of the diffuser portion for passing the pressurized medium therethrough, the gas discharging port having a screw portion formed on an outer surface thereof.

22. An inflator according to claim 21, wherein the igniter is attached to the diffuser portion by crimping a peripheral edge of the opening.

* * * * *